United States Patent
Won et al.

(10) Patent No.: US 9,063,216 B2
(45) Date of Patent: Jun. 23, 2015

(54) METHOD AND APPARATUS FOR PROVIDING LOCATION BASED SERVICE IN WIRELESS COMMUNICATION SYSTEM

(75) Inventors: Jin-Hee Won, Suwon-si (KR);
Sang-Heon Kim, Suwon-si (KR);
Seong-Hyeon Chae, Seoul (KR);
Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 13/210,649

(22) Filed: Aug. 16, 2011

(65) Prior Publication Data
US 2012/0040695 A1 Feb. 16, 2012

(30) Foreign Application Priority Data
Aug. 16, 2010 (KR) .................. 10-2010-0078707

(51) Int. Cl.
*H04W 4/00* (2009.01)
*H04W 24/00* (2009.01)
*H04B 1/38* (2006.01)
*G01S 5/14* (2006.01)
*G01S 5/02* (2010.01)
*H04W 64/00* (2009.01)
*H04W 8/26* (2009.01)

(52) U.S. Cl.
CPC .................. *G01S 5/14* (2013.01); *G01S 5/0236* (2013.01); *H04W 8/26* (2013.01); *H04W 64/00* (2013.01)

(58) Field of Classification Search
CPC ..... H04W 4/02; H04W 88/12; H04W 88/085; H04W 88/04; H04W 8/26; H04W 64/00; H04W 24/00; H04W 16/00; H04W 92/16; H04W 88/02; H04W 88/00; H04B 7/2606; H04L 29/08657; H04M 1/72519; H04Q 1/246; G01S 5/0236; G01S 5/0242
USPC ......... 455/7, 550.1, 556.2, 15–517, 560–561, 455/562.1; 370/274, 279, 285, 315, 492, 370/501, 310, 327–328, 338
See application file for complete search history.

(56) References Cited

U.S. PATENT DOCUMENTS

| | | | | |
|---|---|---|---|---|
| 6,731,905 | B2 * | 5/2004 | Ogino et al. | 455/11.1 |
| 7,139,580 | B2 * | 11/2006 | Stein et al. | 455/456.1 |
| 7,929,477 | B2 * | 4/2011 | Feng et al. | 370/315 |
| 7,929,905 | B1 * | 4/2011 | Warner et al. | 455/7 |
| 8,165,073 | B2 * | 4/2012 | Wang et al. | 370/329 |
| 8,477,690 | B2 * | 7/2013 | Khoryaev et al. | 370/328 |
| 2007/0015461 | A1 * | 1/2007 | Park et al. | 455/13.1 |
| 2007/0123292 | A1 * | 5/2007 | Kang et al. | 455/525 |
| 2007/0184777 | A1 * | 8/2007 | Tanoue | 455/11.1 |
| 2008/0025280 | A1 * | 1/2008 | Hsu et al. | 370/341 |
| 2008/0107078 | A1 * | 5/2008 | Viorel et al. | 370/331 |
| 2008/0260000 | A1 * | 10/2008 | Periyalwar et al. | 375/133 |
| 2009/0156214 | A1 * | 6/2009 | Lee et al. | 455/436 |
| 2009/0252079 | A1 * | 10/2009 | Zhang et al. | 370/315 |

(Continued)

*Primary Examiner* — Meless Zewdu
(74) *Attorney, Agent, or Firm* — Jefferson IP Law, LLP

(57) ABSTRACT

A method and an apparatus for providing a location based service in a wireless communication system are provided. A method of a Base Station (BS) for a Location Based Service (LBS) in a wireless communication system includes allocating identifiers to a plurality of transmission devices in a service coverage area of the BS, generating a Reference Signal (RS) including the identifier of the corresponding transmission device and an identifier of the BS with respect to each of the transmission devices, and transmitting the RS generated for each of the transmission devices, to a Mobile Station (MS) via the corresponding transmission device.

20 Claims, 13 Drawing Sheets

(56) References Cited

U.S. PATENT DOCUMENTS

2010/0046413 A1* 2/2010 Jin et al. .................. 370/315
2010/0177726 A1* 7/2010 Olszewski ............... 370/329
2010/0248615 A1* 9/2010 Oguchi ......................... 455/7
2010/0272009 A1* 10/2010 Cheng et al. ............. 370/315
2010/0323720 A1* 12/2010 Jen ......................... 455/456.1
2011/0021193 A1* 1/2011 Hong ..................... 455/435.1

* cited by examiner

| 0bxxxxxxxx | 18BC23543 | 06361E654 | 27C552A2D | 3A7C69A77 | 011B29374 | 277D31A46 | 14B032757 |

301 ↳ INCLUDES THE INFORMATION OF THE E-LBS

FIG.3

METHOD AND APPARATUS FOR PROVIDING LOCATION BASED SERVICE IN WIRELESS COMMUNICATION SYSTEM

PRIORITY

The present application claims the benefit under 35 U.S.C. §119(a) of a Korean patent application filed in the Korean Intellectual Property Office on Aug. 16, 2010, and assigned Serial No. 10-2010-0078707, the entire disclosure of which is hereby incorporated by reference.

BACKGROUND OF THE INVENTION

1. Field of the Invention

The present invention relates to a method and an apparatus for providing a location based service in a wireless communication system. More particularly, the present invention relates to a method and an apparatus for providing a location-based service using a reference signal in an 802.16m system.

2. Description of the Related Art

Current mobile communication systems are advancing to provide the existing voice communication to various services, such as a multimedia broadcast, multimedia video, and multimedia message. Such a next-generation mobile communication system includes Institute of Electrical and Electronics Engineers (IEEE) 802.16e system recently commercialized, 3rd Generation Partnership Project (3GPP) Long Term Evolution (LTE) being standardized, IEEE 802.20 Ultra Mobile Broadband (UMB), and IEEE 802.16m system.

Recently, those next-generation mobile communication systems offer a Location Based Service (LBS) for providing various services based on a location of a mobile station.

Techniques for estimating the location of the mobile station can be classified into a network based technique and a mobile station based technique. The mobile station based technique includes a method for estimating the location of the mobile station using well-known Global Positioning System (GPS). The method using the GPS exhibits high accuracy of the location estimation, but its accuracy is low in a downtown area and it is inoperable indoors. The network based technique includes a method for estimating a location of a base station and a signal delay time between the mobile station and the base station, or an angle of arrival of the signal using a reference signal of the base station in the wireless communication network, and thus estimating the location of the mobile station. Disadvantageously, the method using the reference signal can raise the location estimation accuracy only when the Reference Signal (RS) is normally sent and received.

Meanwhile, the next-generation mobile communication system studies and develops a distributed base station architecture. The distributed base station architecture is constructed by separating Radio Frequency (RF) transceivers from the base station and relocating them near antennas so that the antennas can function with minimum loss of transmission power. That is, in the distributed base station architecture, a plurality of RF transceivers (hereafter, referred to as Remote Radio Heads or RF Remote Heads (RRHs)) is dispersed in one cell. The RRHs are installed at quite a distance from the base station and connected using optical fiber cables.

In the distributed base station architecture with the RRHs dispersed in one cell or in the wireless communication system based on a relay station, when the base station transmits the RS for the LBS, the RS is sent to the mobile station via the RRHs or the relay stations. However, when the RRHs or the relay stations transmit the RS for the LBS, the mobile station cannot distinguish which RRH or relay station transmits the received RS, and accordingly cannot accurately measure the distance between the base station and the mobile station.

Therefore, a need exists for a method for a mobile station to efficiently receive an RS and to determine which device sends the received RS.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for providing a location based service using a reference signal in a wireless communication system.

Another aspect of the present invention is to provide a method and an apparatus for indicating a transmission location of a reference signal at a base station of a wireless communication system.

Yet another aspect of the present invention is to provide a method and an apparatus for indicating whether a reference signal is transmitted using a System Configuration Descript (SCD) message at a base station of a wireless communication system.

Still another aspect of the present invention is to provide a method and an apparatus for identifying a transmission device of a reference signal in a wireless communication system.

According to an aspect of the present invention, a method of a Base Station (BS) for a Location Based Service (LBS) in a wireless communication system is provided. The method includes allocating identifiers to a plurality of transmission devices in a service coverage area of the BS, generating a Reference Signal (RS) including the identifier of the corresponding transmission device and an identifier of the BS with respect to each of the transmission devices, and transmitting the RS generated for each of the transmission devices, to a Mobile Station (MS) via the corresponding transmission device.

According to another aspect of the present invention, a method of an MS for an LBS in a wireless communication system is provided. The method includes receiving RSs from a plurality of transmission devices, obtaining identification information of a transmission device and identification information of a BS corresponding to the transmission device with respect to each of the received RSs, generating a report message for the LBS based on the obtained identification information of the transmission device, and transmitting the report message to a serving BS of the MS.

According to yet another aspect of the present invention, an apparatus of a BS for an LBS in a wireless communication system is provided. The apparatus includes a controller for allocating identifiers to a plurality of transmission devices in a service coverage area of the BS, and for generating an RS including the identifier of the corresponding transmission device and an identifier of the BS with respect to each of the transmission devices, and a transceiver for transmitting the RS generated for each of the transmission devices, to an MS via the transmission devices.

According to still another aspect of the present invention, an apparatus of an MS for an LBS in a wireless communication system is provided. The apparatus includes a receiver for receiving RSs from a plurality of transmission devices, a controller for obtaining identification information of a transmission device and identification information of a BS corresponding to the transmission device with respect to each of the received RSs, and for generating a report message for the LBS based on the obtained identification information of the transmission device, and a transmitter for transmitting the report message to a serving BS of the MS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 illustrates a reference signal using a Secondary Advanced (SA) preamble in an IEEE 802.16m system according to an exemplary embodiment of the present invention;

Throughout the drawings, like reference numerals will be understood to refer to like parts, components and structures.

DETAILED DESCRIPTION OF EXEMPLARY EMBODIMENTS

Figure 1:
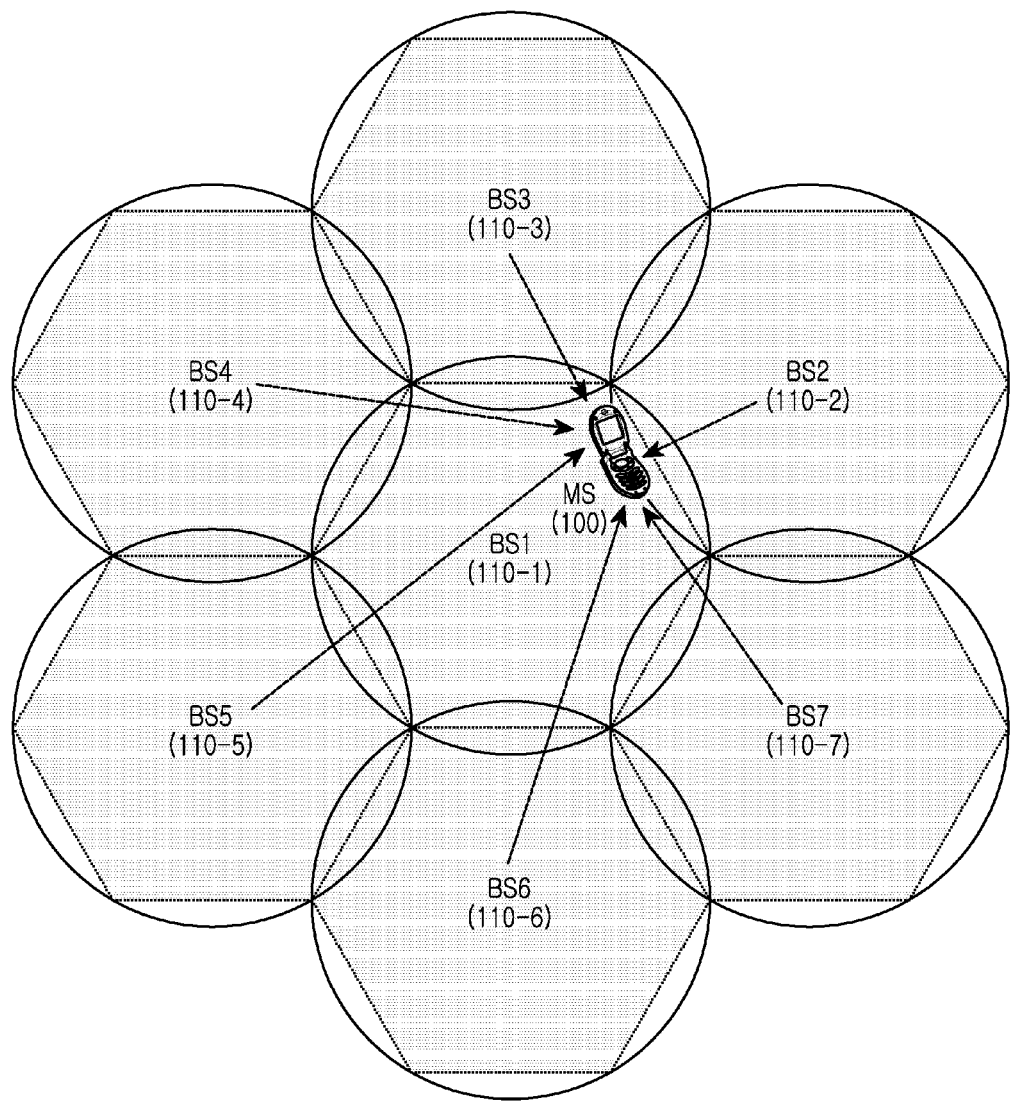
FIG. 1 illustrates a system for transmitting and receiving a reference signal to provide a Location Based Service (LBS) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for transmitting and receiving a Reference Signal (RS) for a Location Based Service (LBS) and identifying a transmission device of the RS in an Orthogonal Frequency Division Multiplexing (OFDM) wireless communication system. Herein, the RS indicates a downlink RS sent from a Base Station (BS) to a Mobile Station (MS) for the LBS in an Institute of Electrical and Electronics Engineers (IEEE) 802.16m system.

Hereinafter, exemplary embodiments of the present invention are equally applicable to OFDM wireless communication systems, and the IEEE 802.16m system is described below by way of example.

FIGS. 1 through 13, described below, and the various exemplary embodiments of the present invention provided are by way of illustration only and should not be construed in any way that would limit the scope of the present invention. Those skilled in the art will understand that the principles of the present disclosure may be implemented in any suitably arranged communications system. The terms used to describe various exemplary embodiments of the present invention provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 illustrates a system for transmitting and receiving an RS to provide an LBS according to an exemplary embodiment of the present invention.

Referring to FIG. 1, a plurality of BS1 110-1 through BS7 110-7 transmits the RS for the LBS. Thereafter, an MS 100 having a BS1 110-1 as its serving BS receives RSs from the BSs 110-1 through 110-7, estimates distances to the corresponding BSs based on the RSs received from at least three BSs, and reports the result to the serving BS 110-1.

The serving BS 110-1 estimates the location of the MS 100 based on the distance information of the corresponding BSs as received from the MS 100.

Alternatively, when the BSs 110-1 through 110-7 transmit the RS, the MS 100 receives the RSs from the BSs 110-1 through 110-7, estimates a reception time of the RS, and identifies the BS transmitting the RS using a unique preamble allocated as a BS identifier in the RS. Thereafter, the MS 100 reports the BS transmitting the RS and the corresponding reception time to the serving BS 110-1.

The serving BS 110-1 estimates the location of the MS 100 using the time when each BS transmits the RS and the information reported from the MS 100.

Figure 2:
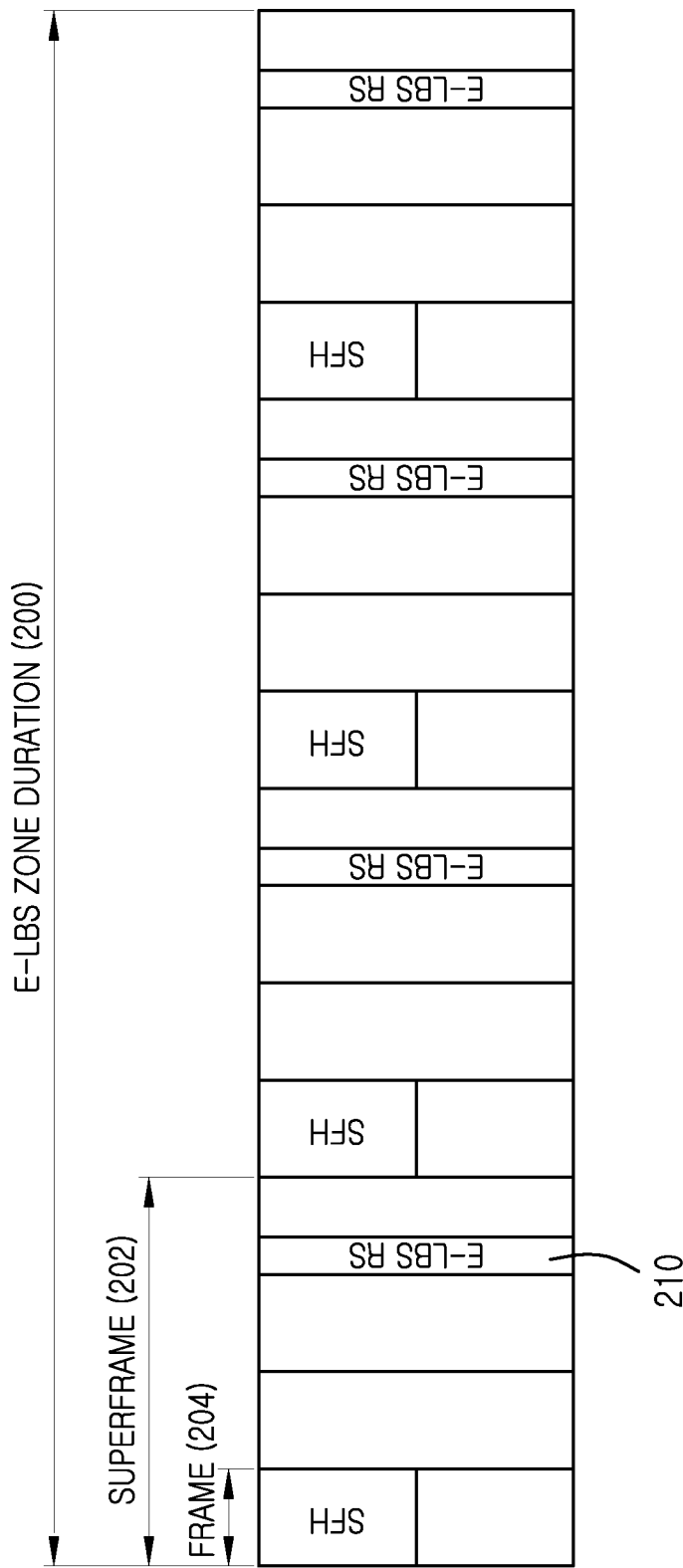
FIG. 2 illustrates a Time Division Duplex (TDD) frame structure in an Institute of Electrical and Electronics Engineers (IEEE) 802.16m system according to an exemplary embodiment of the present invention.

FIG. 2 illustrates a Time Division Duplex (TDD) frame structure in an IEEE 802.16m system according to an exemplary embodiment of the present invention.

Figure 4:
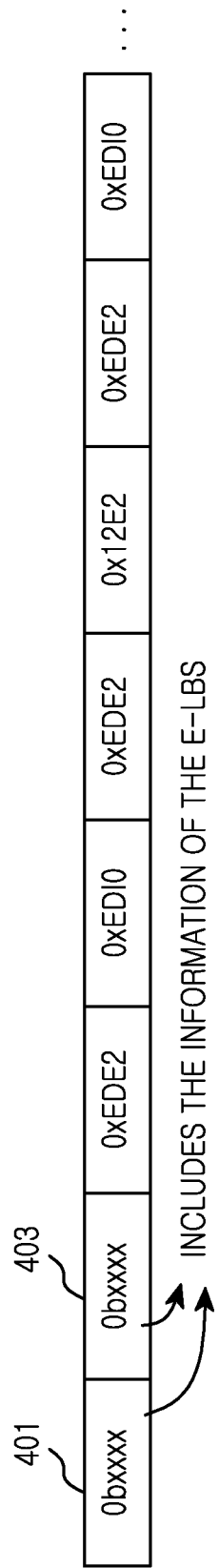
FIG. 4 illustrates a reference signal using a midamble in an IEEE 802.16m system according to an exemplary embodiment of the present invention.

Referring to FIG. 2, to transmit and receive the RS for the LBS, the TDD frame structure of the IEEE 802.16m system sets four superframes as one LBS zone duration 200. Each superframe 202 includes four frames. A preamble lies in the first symbol of each frame 204. The preamble of the last frame of the superframe is used as the RS 210 for the LBS. Accordingly, one LBS zone duration 200 can contain four RSs. At this time, the RS can be constructed as illustrated in FIG. 3 or FIG. 4.

FIG. 3 illustrates an RS using a Secondary Advanced (SA) preamble in an IEEE 802.16m system according to an exemplary embodiment of the present invention.

Referring to FIG. 3, an SA preamble is used as the RS. The SA preamble is uniquely allocated to each BS and used as a BS identifier (or a cell identifier). The RS using the SA preamble includes 288 subcarriers and eight sub-blocks, and is modulated with Quadrature Phase Shift Keying (QPSK).

A first sub-block 301 of the RS indicates transmission device information of the RS or location information of the RS, and the other seven sub-blocks indicate information (e.g., BS identification information) for the LBS as known in the method of the related art.

According to an exemplary embodiment of the present invention, the first sub-block 301 of the RS indicating the transmission device information of the RS is described below.

Figure 5:
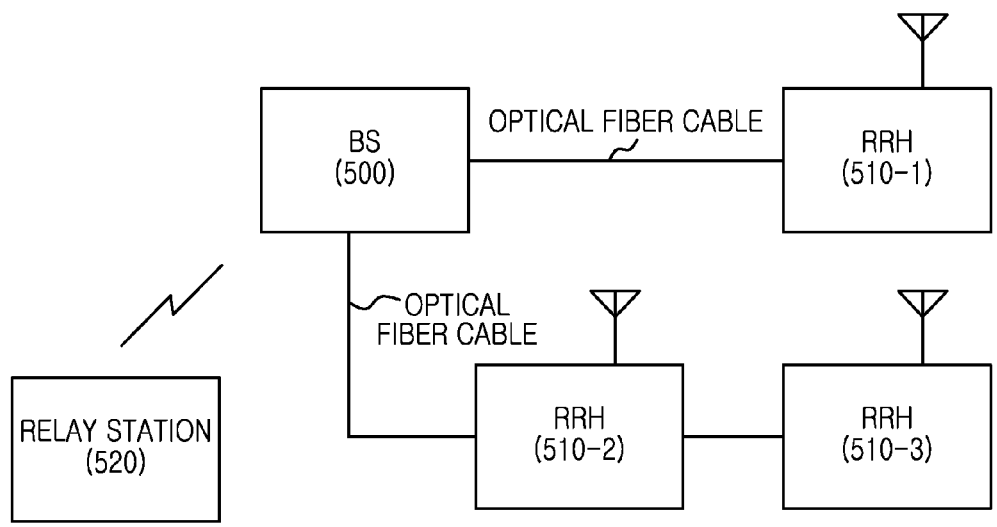
FIG. 5 illustrates a system including a relay station and a Remote Radio Heads or RF Remote Heads (RRH) according to an exemplary embodiment of the present invention.

FIG. 5 illustrates a system including a relay station and a Remote Radio Heads or Radio Frequency (RF) Remote Heads (RRH) according to an exemplary embodiment of the present invention.

Referring to FIG. 5, a service coverage area includes more than one relay station 520, the RS is transmitted from the BS 500 connected to a plurality of RRHs 510-1 through 510-3 using optical fiber cables, to the MS 520. As the first sub-block 301 of the RS contains RRH IDentification (ID) or relay station ID, it is possible to indicate which RRH or relay station transmits the RS. In the method of the related art, a plurality of relay stations or a plurality of RRHs equally transmits the unique SA preamble of the BS in the service coverage area of a particular BS. Hence, the MS cannot identify which relay station or RRH transmits the RS, and cannot precisely estimate the location of the MS since it merely recognizes that the RS is sent from the BS. In contrast, in exemplary embodiments of the present invention, since the sub-block 301 of the RS contains the RRH or relay station ID transmitting the RS, the MS, which receives the RS, can identify which relay station or RRH transmits the corresponding RS.

In so doing, the first sub-block 301 can indicate the transmission device information of the RS in various manners. For example, when each sub-block includes nine hexacodes, the transmission device information of the RS can include four bits to repeat nine times in the sub-block 301. In this case, the RRH ID and relay station ID can be allocated a value 0~15.

According to another exemplary embodiment of the present invention, the first sub-block 301 of the RS indicating the location information of the RS is described below.

Using the first sub-block 301, the RS can indicate the LBS zone or the superframe carrying the RS. For example, the first sub-block 301 may indicate whether the RS is transmitted in the next LBS zone, and to which LBS zone from the next LBS zone do not carry the RS.

Figure 6:
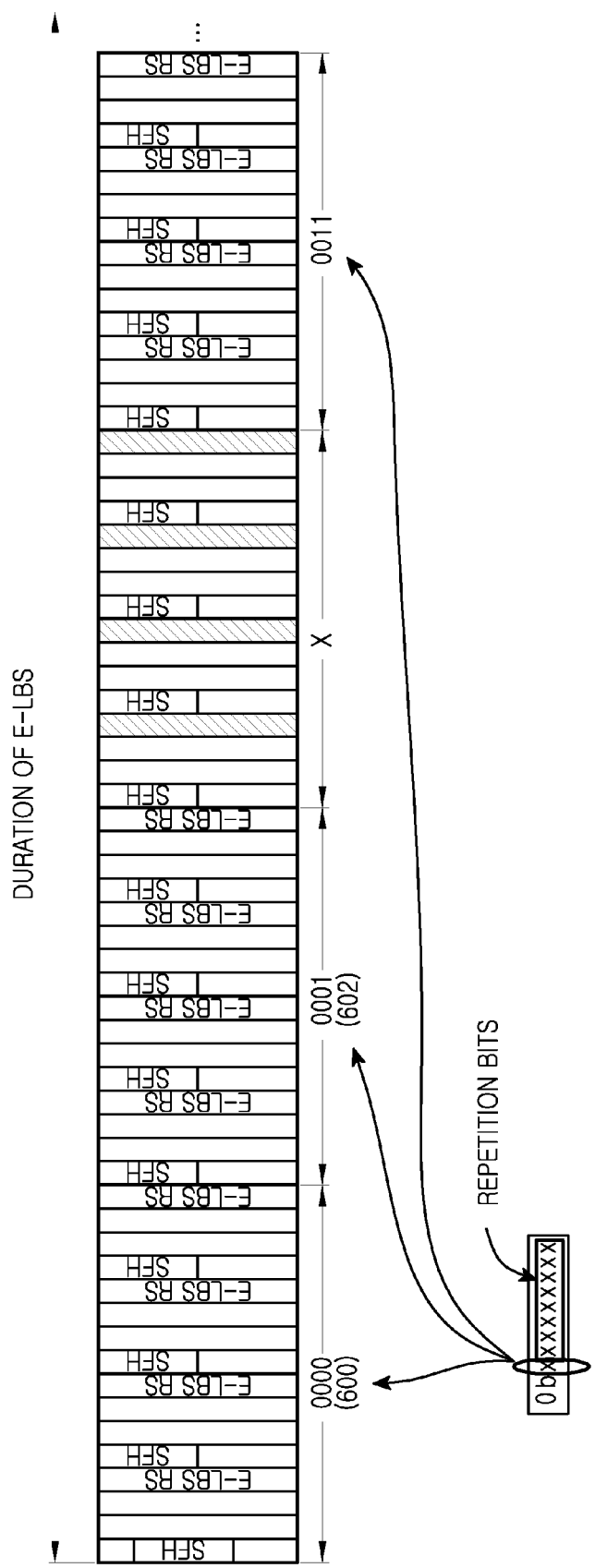
FIG. 6 illustrates a frame including a reference signal based on an LBS zone in an IEEE 802.16m system according to an exemplary embodiment of the present invention.

FIG. 6 illustrates a frame including a reference signal based on an LBS zone in an IEEE 802.16m system according to an exemplary embodiment of the present invention.

Referring to FIG. 6, assuming that the first sub-block 301 carries 4-bit RS location information, the 4-bit information of the first sub-block 301 can be set to '0000' 600 to indicate that the RS is transmitted in the next LBS zone, and to '0001' 602 to indicate that the next LBS zone does not carry the RS and an LBS zone after the next LBS zone carries the RS. According to the RS location information, the MS may wait to receive the RS of the next LBS zone, or perform other operation, rather than waiting to receive the RS of the next LBS zone, because the next LBS zone does not carry the RS.

In addition, the first sub-block 301 can indicate whether the next superframe carries the RS, and to which superframe from the next superframe do not carry the RS.

Figure 7:
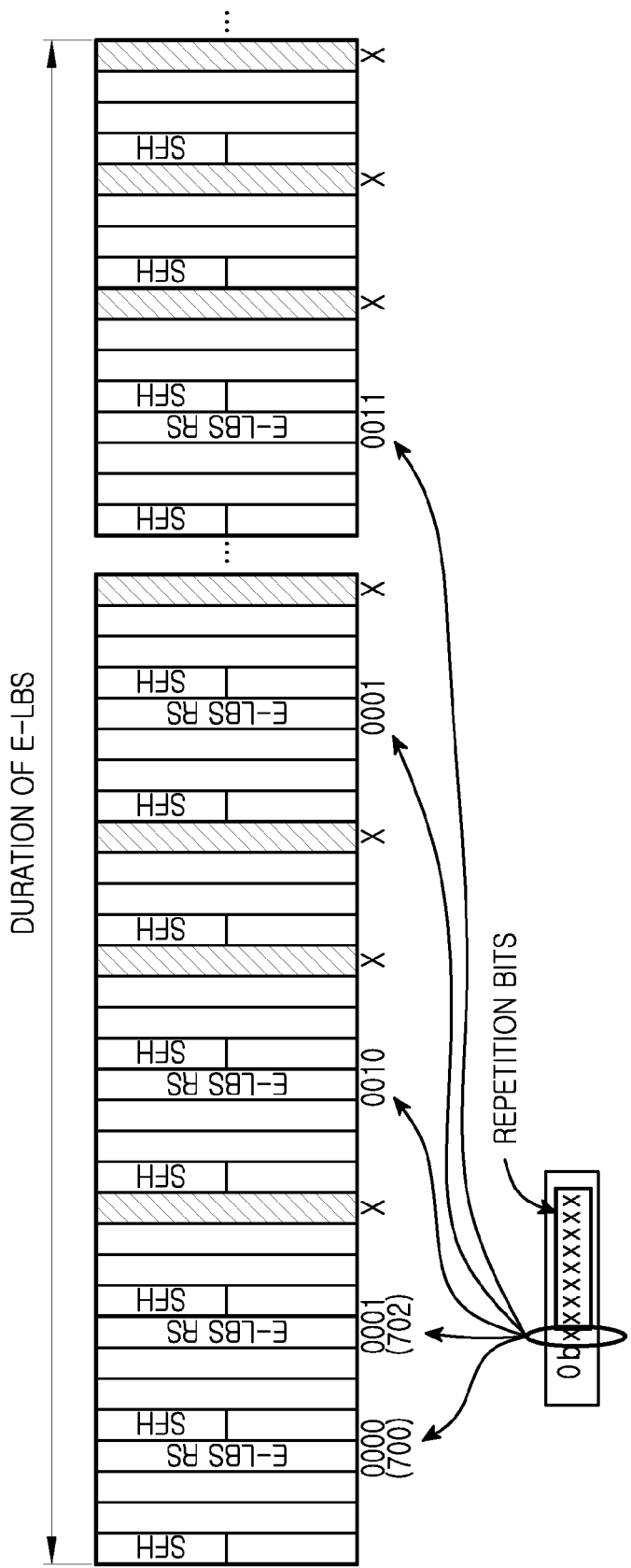
FIG. 7 illustrates a frame including a reference signal based on a superframe in an IEEE 802.16m system according to an exemplary embodiment of the present invention.

FIG. 7 illustrates a frame including a reference signal based on a superframe in an IEEE 802.16m system according to an exemplary embodiment of the present invention.

Referring to FIG. 7, assuming that the first sub-block 301 carries 4-bit RS location information, the 4-bit information of the first sub-block 301 can be set to '0000' 700 to indicate that the RS is transmitted in the next superframe, and to '0001' 702 to indicate that the next superframe does not carry the RS but a superframe after the next superframe carries the RS. Based on the RS location information, the MS may wait to receive the RS of the next superframe, or perform other operation, rather than waiting to receive the RS of the next superframe, because the next superframe does not carry the RS.

Herein, the first sub-block 301 can indicate the location information of the RS in various manners. For example, when each sub-block includes nine hexacodes, the location information of the RS can include four bits to repeat nine times within the sub-block 301. The information is repeated nine times in the sub-block 301 in order to minimize error, and the nine repetitions can achieve boosting effect of 9.54 decibels (dB).

According to another exemplary embodiment of the present invention, a System Configuration Descript (SCD) message broadcast by the BS to indicate overall information of the system can indicate whether the BS transmits the RS. That is, in the IEEE 802.16 system, the MS, after receiving the SCD message from the BS, can receive the RS for the LBS. Hence, the location of the initially transmitted RS can be indicated using the SCD message.

Table 1 shows information contained in the SCD message.

TABLE 1

| M/O | Attributes | Size (bits) | Value/Note | conditions |
|---|---|---|---|---|
| O | E-LBS Configuration Parameters | DLBS 1 | Indicates the E-LBS configuration 0b0: No E-LBS zone 0b1: E-LBS zone exists | Present when E-LBS is configured |

DLBS, which is a parameter for the LBS, indicates whether the RS is transmitted. That is, DLBS '0' implies that no RS is transmitted until the next SCD message is received, and DLBS '1' implies that the RS is transmitted in the next superframe.

While the RS using the SA preamble has been illustrated, the RS may be formed using a midamble as shown in FIG. 4.

FIG. 4 illustrates an RS using a midamble in an IEEE 802.16m system according to an exemplary embodiment of the present invention.

Referring to FIG. 4, a midamble is used as the RS. The midamble uses 2048-bit Golay sequence. Since one subblock in the Golay sequence includes four hexacodes, the RS includes 18 sub-blocks in total.

First and second sub-blocks 401 and 403 of the RS, respectively, indicate transmission device information of the RS or location information of the RS, and the other six sub-blocks indicate information (e.g., BS identification information) for the LBS as known in the method of the related art. Herein, the RS transmission device information or the RS location information can include one or more sub-blocks and employ a Binary Phase Shift Keying (BPSK) modulation scheme. How many sub-blocks of the midamble are used to indicate the RS transmission device information or the RS location information can determine the boosting effect achieved severalfold. For example, assuming that the RS transmission device information or the RS location information is 4 bits, when one sub-block of the midamble is used to indicate the information, the 4-bit information is repeated four times and thus 6 dB boosting effect can be achieved. When two sub-blocks of the midamble are used to indicate the information, the 4-bit information is repeated eight times and thus 9 dB boosting effect can be achieved. Notably, the bits indicating the information may be increased according to the radio channel environment and the QPSK modulation scheme may be adopted.

Figure 8:
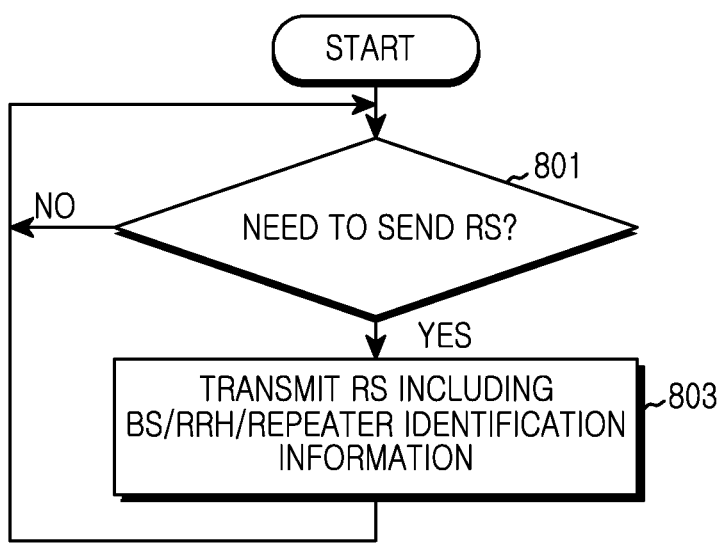
FIG. 8 illustrates operations of a base station in a wireless communication system according to an exemplary embodiment of the present invention.

FIG. 8 illustrates operations of a BS in a wireless communication system according to an exemplary embodiment of the present invention. Herein, it is assumed that the service coverage area of the BS includes one or more relay stations or the plurality of the RRHs is connected to the BS via the optical fiber cables.

Referring to FIG. 8, the BS determines whether it is necessary to transmit the RS in step 801. Whether it is necessary to transmit the RS can be determined according to a preset scheme of the BS like the known scheme of the related art.

If it is determined in step 801 that it is necessary to transmit the RS, the BS generates a plurality of RSs including identification information of the BS and identification information of the relay stations or the RRHs in the service coverage area of the BS, based on the SA preamble or the midamble, and transmits the generated RS to the MS via the corresponding relay station or the corresponding RRH in step 803. Referring back to FIG. 5, when the service coverage area of the BS 500 includes one relay station 520 and the three RRHs 510-1 through 510-3, the BS 500 generates four RSs including the identification information pre-allocated to the relay station 520 and the three RRHs 510-1 through 510-3 respectively and the identification information of the BS, and transmits the generated RS to the MS via the corresponding relay station 520 or RRH 510-1, 510-2, or 510-3. For example, the BS of FIG. 5 generates the RS of FIG. 3 or FIG. 4 using the identification information of the RRH1 510-1 and the identification information of the BS and transmits the RS to the MS via the RRH1 510-1.

Thereafter, the BS returns to step 801.

Figure 9:
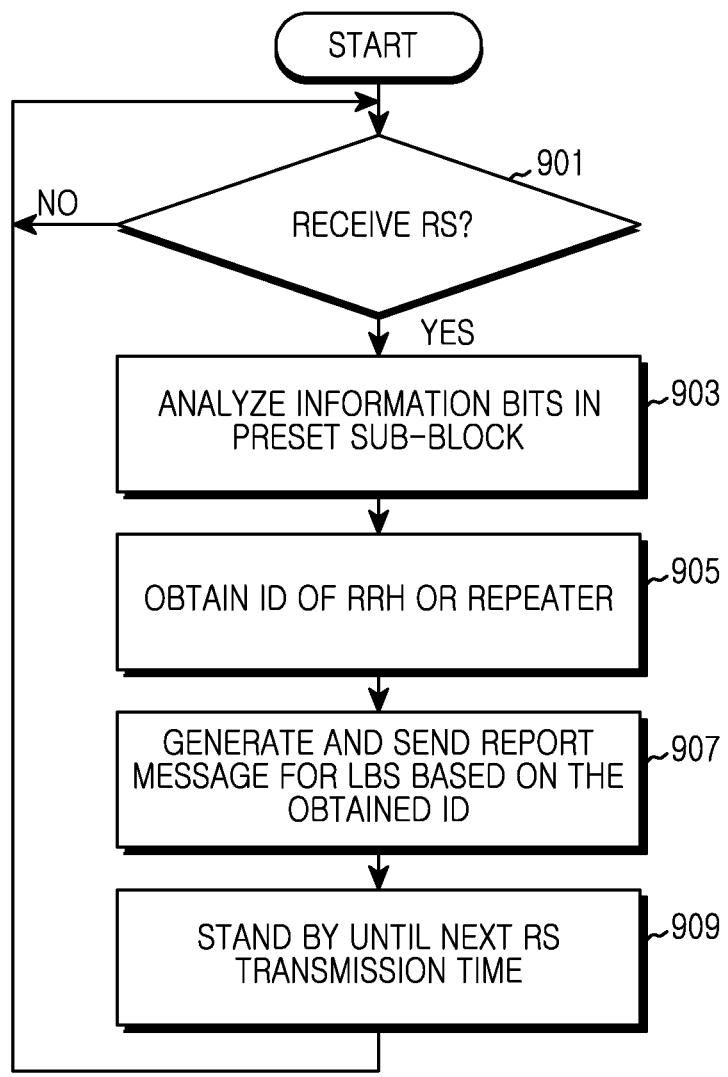
FIG. 9 illustrates operations of a mobile station in a wireless communication system according to an exemplary embodiment of the present invention.

FIG. 9 illustrates operations of an MS in a wireless communication system according to an exemplary embodiment of the present invention.

Referring to FIG. 9, the MS determines whether the RS is received in step 901. Upon receiving the RS, the MS extracts and analyzes the information bits from at least one preset sub-block in step 903, and obtains the ID indicating the transmission device of the RS in step 905. For example, the MS obtains the identification information indicating which relay station or RRH transmits the corresponding RS, from the first sub-block of the SA preamble or the first and second sub-blocks of the midamble used as the RS.

In step 907, the MS generates and transmits a report message for the LBS based on the obtained ID. For example, the MS can generate the report message including the reception time of the RS and the ID obtained from the RS, and transmits the report message to its serving BS.

The MS stands by until the next RS is transmitted in step 909 and goes back to step 901.

Figure 10:
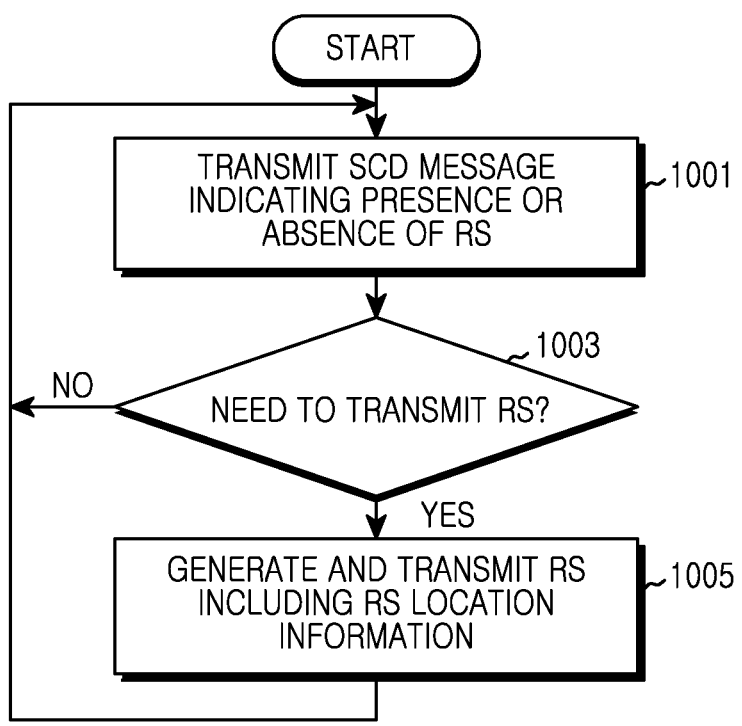
FIG. 10 illustrates operations of a base station in a wireless communication system according to an exemplary embodiment of the present invention.

FIG. 10 illustrates operations of a BS in a wireless communication system according to an exemplary embodiment of the present invention. The operations of FIG. 10 are applicable even when the service coverage area of the BS does not cover the relay station or the RRH.

Referring to FIG. 10, the BS generates and broadcasts the SCD message indicating whether or not the RS is transmitted in step 1001. The SCD message can indicate that the RS is not transmitted until the next SCD message is sent or that the next superframe carries the RS by additionally setting the parameter indicative of whether the RS is transmitted as shown in Table 1. The SCD message can be broadcast periodically.

In step 1003, the BS determines whether it is necessary to transmit the RS before broadcasting the next SCD message. If it is determined in step 1003 that it is not necessary to transmit the RS before broadcasting the next SCD message, the BS stands by to transmit the next SCD message and repeats step 1001.

In contrast, if it is determined in step 1003 that it is necessary to transmit the RS before broadcasting the next SCD message, the BS transmits the RS including its identification information at preset intervals in step 1005. In so doing, the BS generates the RS including the information indicating the transmission location of the next RS as shown in FIG. 3 or FIG. 4.

Thereafter, the BS returns to step 1001.

Figure 11:
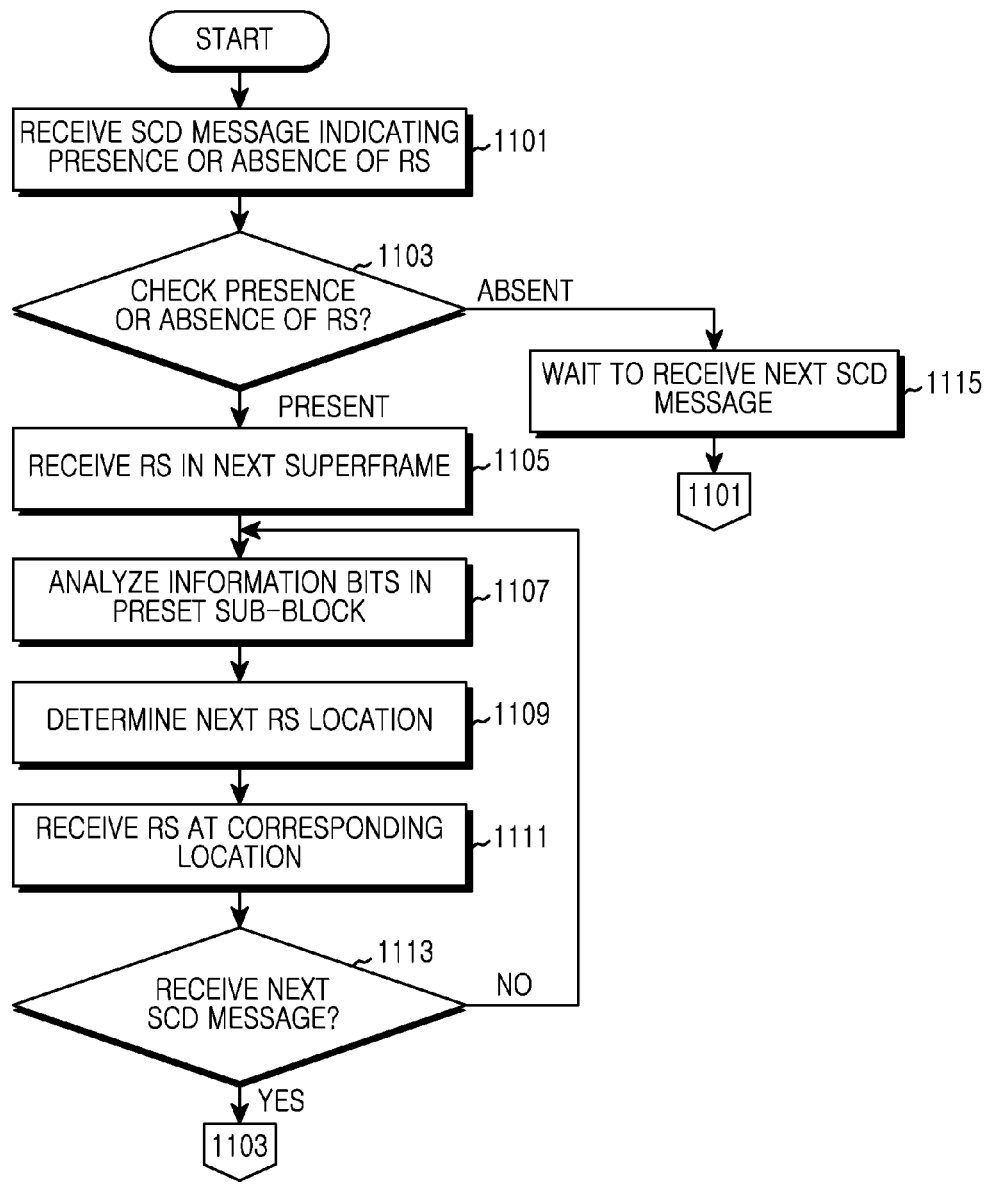
FIG. 11 illustrates operations of a mobile station in a wireless communication system according to an exemplary embodiment of the present invention.

FIG. 11 illustrates operations of an MS in a wireless communication system according to an exemplary embodiment of the present invention.

Referring to FIG. 11, the MS receives the SCD message indicating the presence or absence of the RS, from the BS in step 1101.

In step 1103, the MS determines whether the RS is transmitted before the next SCD message is received by analyzing the parameter indicating whether the RS is sent, in the SCD message. If it is determined in step 1103 that the RS is not transmitted until the next SCD message is received according to the parameter analysis result (i.e., absence of RS is determined), the MS waits to receive the next SCD message in step 1115 and returns to step 1101.

In contrast, if it is determined in step 1103 that the RS is transmitted before the next SCD message is received according to the parameter analysis result (i.e., presence of RS is determined), the MS receives the RS in the next superframe in step 1105, extracts and analyzes the information bits from at least one preset sub-block in step 1107, and acquires the location information carrying the next RS in step 1109. For example, the MS obtains the identification information indicating whether the next superframe or LBS zone carries the RS, from the first sub-block of the SA preamble or the first and second sub-blocks of the midamble used as the RS.

Thereafter, the MS receives the RS at the transmission location of the next RS in step 1111 and determines whether the next SCD message is received in step 1113. If it is determined in step 1113 that the next SCD message is not received, the MS goes back to step 1107. In contrast, if it is determined in step 1113 that the next SCD message is received, the MS goes back to step 1103.

Figure 12:
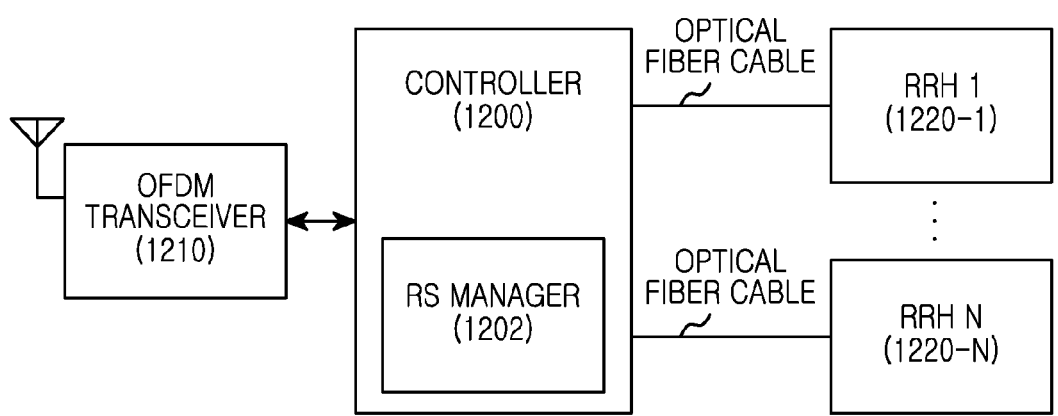
FIG. 12 is a block diagram of a base station in a wireless communication system according to an exemplary embodiment of the present invention.

FIG. 12 is a block diagram of a BS in a wireless communication system according to an exemplary embodiment of the present invention.

Referring to FIG. 12, the BS includes a controller 1200, an OFDM transceiver 1210, and a plurality of RRHs 1220-1 through 1220-N.

The controller 1200 controls operations of the BS and the LBS. For example, the controller 1200 broadcasts overall information of the system and the information indicating whether the RS is transmitted using the SCD message.

More particularly, the controller 1200 may include an RS manager 1202, determines the RS transmission time according to a preset manner, and generates the RS including the identification information of the BS. When the service coverage area of the BS includes a plurality of relay stations or a plurality of RRHs 1220-1 through 1220-N, the RS manager 1202 allocates identification information for the LBS to each of the relay stations or the RRHs 1220-1 through 1220-N, and generates a plurality of RSs including the identification information of the BS and the identification information of the relay stations or the RRHs based on the SA preamble or the midamble. More specifically, when the service coverage area of the BS includes the N-ary RRHs 1220-1 through 1220-N, the RS manager 1202 generates N-ary RSs including the identification information pre-allocated to the N-ary RRHs 1220-1 through 1220-N and the identification information of the BS, and controls to transmit the generated RS to the MS via the corresponding RRH 1220-1 through 1220-N. For example, the RS manager 1202 generates the RS of FIG. 3 or FIG. 4 using the identification information of the RRH1 1220-1 and the identification information of the BS, and controls to transmit the generated RS to the MS via the RRH1 1220-1. Furthermore, the controller 1200 controls to transmit a report message about the RS from the MS, and estimates a location of the MS based on the report message.

In addition, the RS manager 1202 can generate the RS including the information indicating the transmission location of the next RS as shown in FIG. 3 or FIG. 4.

The OFDM transceiver 1210 OFDM-modulates and transmits data and control information output from the controller 1200 over an antenna, and OFDM-demodulates and provides data and information received over the antenna to the controller 1200. For example, the OFDM transceiver 1210 OFDM-modulates and transmits the SCD message and the RS output from the controller 1200 over the antenna, and OFDM-demodulates and provides the report message received from the MS over the antenna to the controller 1200.

The RRHs 1220-1 through 1220-N each are allocated the identification information for the LBS from the controller 1200, and transmit the generated RS of FIG. 3 or FIG. 4 to the MS under control of the controller 1200.

Figure 13:
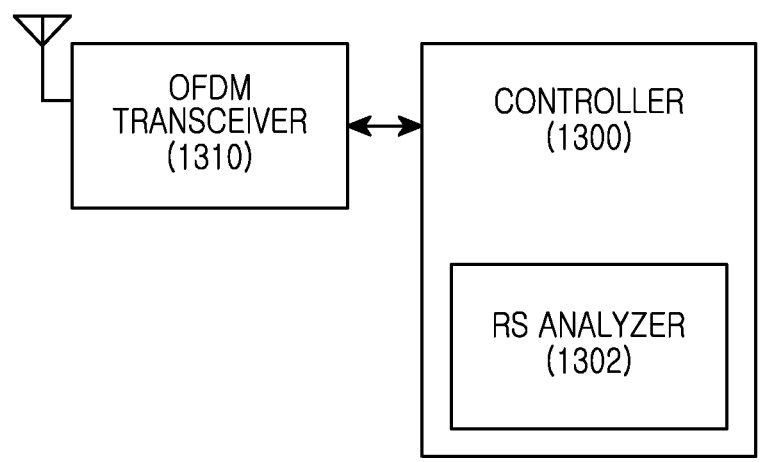
FIG. 13 is a block diagram of a mobile station in a wireless communication system according to an exemplary embodiment of the present invention.

FIG. 13 is a block diagram of an MS in a wireless communication system according to an exemplary embodiment of the present invention.

Referring to FIG. 13, the MS includes a controller 1300 and an OFDM transceiver 1310.

The controller 1300 controls operations of the MS. In addition, the controller 1300 analyzes the RS for the LBS and generates and transmits the report message. More particularly, the controller 1310 may include an RS analyzer 1302, determines whether the RS is transmitted by analyzing the SCD message received from the BS, and controls and processes to receive the RS. More specifically, when the SCD message includes the parameter indicative of the RS transmission as shown in Table 1, the RS analyzer 1302 processes to receive the RS in the next superframe. When the SCD message includes the parameter indicative of no transmission of the RS, the RS analyzer 1302 does not wait to receive the RS until the next SCD message is received.

The RS analyzer 1302 obtains the transmission device information of the corresponding RS or the location information of the next RS from the preset sub-block of the received RS. Upon obtaining the transmission device information of the corresponding RS from the preset sub-block of the received RS, the RS analyzer 1302 generates the report message including the reception time of the corresponding RS and the transmission device information. For example, the report message includes at least one of the identification information of the transmission device, the identification information of the BS, a distance between the MS and the transmission device, and a reception time of the RS. Upon obtaining the location information of the next RS from the preset sub-block of the received RS, the RS analyzer 1302 waits to receive the next RS based on the obtained location information.

The OFDM transceiver 1310 OFDM-demodulates and provides data and information received over an antenna to the controller 1300, and OFDM-modulates and transmits the data and the control information output from the controller 1300 over the antenna. For example, the OFDM transceiver 1310 OFDM-demodulates and provides the SCD message and the RS received over the antenna to the controller 1300, and OFDM-modulates and transmits the report message output from the controller 1300 to the BS over the antenna.

While the transmission location of the next RS or the transmission device of the corresponding RS is indicated using the certain sub-block of the SA preamble or the midamble used as the RS, the sub-block can indicate both of the transmission location information of the next RS and the transmission device information of the corresponding RS.

As the BS of the wireless communication system indicates whether or not the RS is transmitted using the SCD message for the LBS and indicates the transmission location of the next RS, the MS can efficiently receive the RS. As the BS indicates the transmission device identification information of the corresponding RS in the RS, the MS can determine which device transmits the RS and thus accurately estimate the location of the MS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a Base Station (BS) for a Location Based Service (LBS) in a wireless communication system, the method comprising:

allocating identifiers to a plurality of Radio Frequency (RF) transceivers included in the BS;

generating a plurality of reference signals for each of the plurality of RF transceivers, wherein each of the plurality of reference signals comprises an identifier of the BS and an identifier, in the allocated identifiers, of a corresponding RF transceiver of the plurality Radio Frequency (RF) transceivers; and transmitting each of the plurality of reference signals generated for each of the plurality of RF transceivers, to a Mobile Station (MS) via the corresponding RF transceiver.

2. The method of claim 1, wherein each of the plurality of reference signals is generated based on either a Secondary Advanced (SA) preamble or a midamble.

3. The method of claim 1, wherein the identifier of the RF transceiver is repeated for a certain number of times within at least one of sub-blocks constituting each of the plurality of reference signals.

4. The method of claim 1, wherein the plurality of the RF transceivers comprises a Remote Radio Head (RRH).

5. The method of claim 1, further comprising:
receiving a report message about each of the plurality of reference signals from the MS; and
estimating a location of the MS based on the report message.

6. A method of a Mobile Station (MS) for a Location Based Service (LBS) in a wireless communication system, the method comprising:
receiving a plurality of reference signals from a plurality of Radio Frequency (RF) transceivers;
obtaining identification information of a Base Station (BS) and identification information of an RF transceiver among a plurality of RF transceivers included in the BS from each of the plurality of received reference signals;
generating a report message for the LBS based on the obtained identification information of the RF transceiver among the plurality of RF transceivers; and
transmitting the report message to a serving BS of the MS.

7. The method of claim 6, wherein each of the plurality of reference signals is generated based on either a Secondary Advanced (SA) preamble or a midamble.

8. The method of claim 6, wherein the identification information of the RF transceiver is repeated for a certain number of times within at least one of sub-blocks constituting each of the plurality of reference signals.

9. The method of claim 6, wherein the plurality of the RF transceivers comprises a Remote Radio Head (RRH).

10. The method of claim 6, wherein the report message comprises at least one of the identification information of the RF transceiver, the identification information of the BS, a distance between the MS and the RF transceiver, and a reception time of each of the plurality of reference signals.

11. An apparatus of a Base Station (BS) for a Location Based Service (LBS) in a wireless communication system, the apparatus comprising:
a controller configured:
to allocate identifiers to a plurality of Radio Frequency (RF) transceivers included in the BS, and
to generate a plurality of reference signals for each of the plurality of RF transceivers, wherein each of the plurality of reference signals comprises an identifier, in the allocated identifiers, of a corresponding RF transceiver and an identifier of the BS; and
a transceiver configured to transmit each of the plurality of reference signals generated for each of the plurality of RF transceivers, to a Mobile Station (MS) via the corresponding RF transceiver.

12. The apparatus of claim 11, wherein each of the plurality of reference signals is generated based on either a Secondary Advanced (SA) preamble or a midamble.

13. The apparatus of claim 11, wherein the identifier of the RF transceiver is repeated for a certain number of times within at least one of sub-blocks constituting each of the plurality of reference signals.

14. The apparatus of claim 11, wherein the plurality of the RF transceivers comprises a Remote Radio Head (RRH).

15. The apparatus of claim 11, wherein the transceiver receives a report message about each of the plurality of reference signals from the MS and the controller estimates a location of the MS based on the report message.

16. An apparatus of a Mobile Station (MS) for a Location Based Service (LBS) in a wireless communication system, the apparatus comprising:
a receiver configured to receive reference signals from a plurality of Radio Frequency (RF) transceivers;
a controller configured:
to obtain identification information of a Base Station (BS) and identification information of an RF transceiver among a plurality of RF transceivers included in the BS from each of the plurality of received reference signals, and
to generate a report message for the LBS based on the obtained identification information of the RF transceiver; and
a transmitter configured to transmit the report message to a serving BS of the MS.

17. The apparatus of claim 16, wherein each of the plurality of reference signals is generated based on either a Secondary Advanced (SA) preamble or a midamble.

18. The apparatus of claim 16, wherein the identification information of the RF transceiver is repeated for a certain number of times within at least one of sub-blocks constituting each of the plurality of reference signals.

19. The apparatus of claim 16, wherein the plurality of the RF transceivers comprises a Remote Radio Head (RRH).

20. The apparatus of claim 16, wherein the report message comprises at least one of the identification information of the RF transceiver, the identification information of the BS, a distance between the MS and the RF transceiver, and a reception time of each of the plurality of reference signals.

* * * * *